C. E. Lewis.
Sharpening Machine.

N° 97,415.          Patented Nov. 30, 1869.

Witnesses:
J. W. Mister
J. Snowden Bell

Inventor:
Chas. E. Lewis
By McGill, Grant & Co
Attys.

United States Patent Office.

CHARLES E. LEWIS, OF NORTHFIELD, VERMONT.

Letters Patent No. 97,415, dated November 30, 1869.

---

IMPROVEMENT IN DEVICE FOR GRINDING SAW-GUMMER BURRS.

---

The Schedule referred to in these Letters Patent and making part of the same.

---

*To all whom it may concern:*

Be it known that I, CHARLES E. LEWIS, of Northfield, in the county of Washington, and State of Vermont, have invented certain new and useful Improvements in Devices for Grinding Saw-Gummer Burrs, of which the following is a full, clear, and exact description, reference being had to the accompanying drawings, which make part of this specification, and in which—

Figure 1:
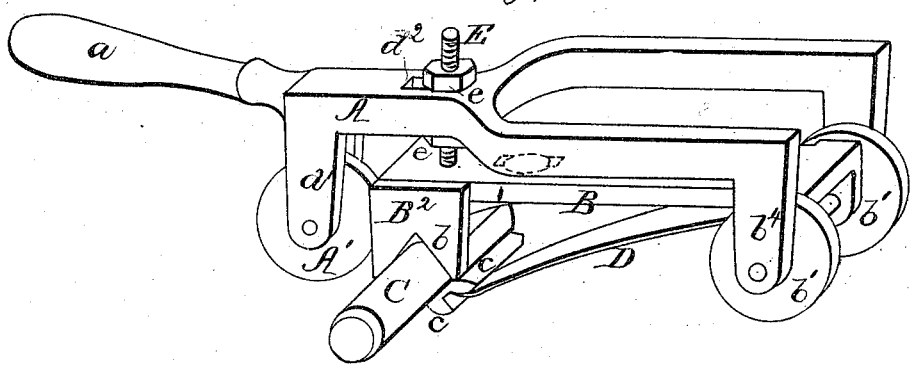

Figure 1 represents a view, in perspective, of my improvement, and

Figure 2:
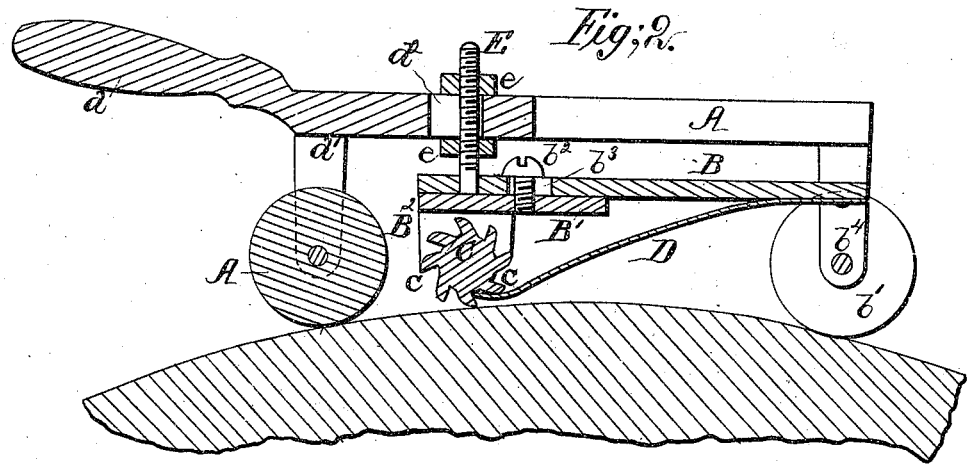

Figure 2, a vertical longitudinal section of the same applied to a grindstone.

The object of my invention is to provide a simple and efficient means of holding to the stone, saw-gummer burrs or cutters while being ground, so as to insure that the cutting-edges of the same shall have a uniform bevel or taper throughout their length, and be everywhere equal, one with another, in their distance, radially, from their common axis, while the degree of bevel in one set of cutters may be made to vary from that of another set, as the nature of the work performed by them may demand. To this end, My improvements consist in a light carriage, to which the burr is to be attached, while undergoing the process of grinding, in such a manner as to be easily adjusted to all the requirements of the occasion.

In the accompanying drawings, which show a convenient arrangement of parts for carrying out the objects of my invention, A represents a light metallic frame, in form of a yoke, or Y, having a handle, $a$, at the end of its central arm, by which it is held upon the grindstone.

Pendants $a^1$, secured to or formed in a piece with the frame A, project downward therefrom at the end of the central arm, and similar pendants, $b^4$, are correspondingly placed at the ends of the side arms.

A wheel, $A^1$, is mounted in bearings near the lower ends of the pendants $a^1$, and two wheels, $b^1$ $b^1$, rotate upon a shaft secured to the pendants $b^4$, near their lower ends.

All three wheels may be either fast or loose upon their shafts, according as the latter rotate or are made stationary in the pendants, as found most convenient.

An arm, B, is pivoted loosely upon the shaft of the wheels $b^1$, and extends toward the central arm of the frame A.

A screw, E, is secured to the free end of the arm B, and passes through a slot, $a^2$, in the frame, being provided with nuts $e$ above and below the same.

By proper movement of the nuts, the arm is raised or lowered, as required.

A carriage, $B^1$, is secured to the arm B, by a screw, $b^2$, passing through a slot, $b^3$, in the same.

By slacking the screw $b^2$, and moving it along the slot, the carriage can be moved toward or away from the wheels $b^1$.

C represents a saw-gummer burr, which is of cylindrical form, and provided with a series of cutters $c$ $c$ upon its periphery.

When the burr is to be ground, it is placed, as shown in the drawing, in the angular recesses $b$ of the pendants $B^2$, which project below the carriage $B^1$ at the end nearest the wheel $A^1$, and is held in position by a spring, D, which bears against one of the cutters $c$.

The device is now placed upon a grindstone, as shown in fig. 2, the position of the arm B being regulated by the screw E and nuts $e$, so that the wheels $b^1$ and the cutter $c$ to be ground shall bear upon the stone.

The latter is then rotated until the cutter is ground so far that the wheel A will bear upon the grindstone, and prevent further action of the same upon the cutter.

The burr is then turned in the recesses $b$ until the next cutter is brought into proper position to be ground, and the operation is repeated and continued in this manner until all the cutters are finished.

The wheel A acts as a gauge, and it will be observed that when a cutter is ground so far as to allow all three wheels to bear upon the stone, it can be ground no further, except by lowering the arm B.

By this arrangement, the cutters are ground in a uniform manner all around the burr, and their depth may be uniformly varied, as desired.

By moving the carriage $B^1$ toward or from the wheels $b^1$, which can be done, as before stated, by means of the screw $b^2$ and slot $b^3$, the angle or bevel at which the cutters are ground can be varied when necessary.

My invention enables a saw-gummer burr to be ground accurately and uniformly, thus causing the operation of the same to be more efficient and satisfactory than when ground by hand, and expediting and simplifying the work of grinding.

What I claim as my invention, and desire to secure by Letters Patent, is—

The frame A and wheels $b^1$, in combination with the pivoted arm B, longitudinally-adjustable carriage B, screw E, nuts $e$, and wheel $A^1$, the whole arranged and operating substantially as set forth.

In testimony that I claim the foregoing improvements, I have hereunto set my hand, this 25th day of March, 1869.

CHARLES E. LEWIS.

Witnesses:
GEORGE W. SOPER,
CHARLES A. BRAMAN.